United States Patent [19]

Elliott

[11] 4,225,275
[45] Sep. 30, 1980

[54] DRILL BIT

[76] Inventor: William L. Elliott, P.O. Box 67, Millwood, Va. 22646

[21] Appl. No.: 885,284

[22] Filed: Mar. 10, 1978

[51] Int. Cl.³ .................. B23B 51/08; B23B 51/10
[52] U.S. Cl. ............................ 408/229; 408/199; 407/61; 144/219
[58] Field of Search ........ 408/227, 228, 229, 223–226, 408/199, 211, 230, 118; 407/57, 60, 61; 144/219; 145/116 R, 114

[56] References Cited

U.S. PATENT DOCUMENTS

| 93,824 | 8/1869 | Humphreys | 408/224 |
|---|---|---|---|
| 479,682 | 7/1892 | Tompkins | 408/229 |
| 594,914 | 12/1897 | Shorb | 408/231 |
| 659,125 | 10/1900 | Boentgen | 408/118 |
| 1,446,194 | 2/1923 | McCullough | 144/219 |
| 2,223,485 | 12/1940 | Eveleth | 144/219 |
| 2,391,396 | 12/1945 | Denison | 408/230 |
| 2,411,209 | 11/1946 | Hall et al. | 408/229 |
| 2,482,535 | 9/1949 | Bayless | 408/230 |
| 2,640,379 | 6/1953 | Graves | 408/228 |
| 2,715,772 | 8/1955 | Fritz | 408/229 |
| 2,735,116 | 2/1956 | Mueller | 408/226 |
| 2,795,979 | 6/1957 | Zerwick | 408/229 |
| 3,564,945 | 2/1971 | Bradley | 408/227 |
| 3,997,279 | 12/1976 | Porter | 408/225 |

Primary Examiner—Leonidas Vlachos
Attorney, Agent, or Firm—Finnegan, Henderson, Farabow, Garrett & Dunner

[57] ABSTRACT

A drill bit comprising a shank having three cutting blades extending radially therefrom with the longitudinal cutting edges of the blades defining a right circular cylinder coaxial with the axis of the shank. At the working end of the shank a countersink cutting point is formed by the cutting edges of the blades sloping together to a common point on the axis of the shank and defining a right circular cone.

5 Claims, 4 Drawing Figures

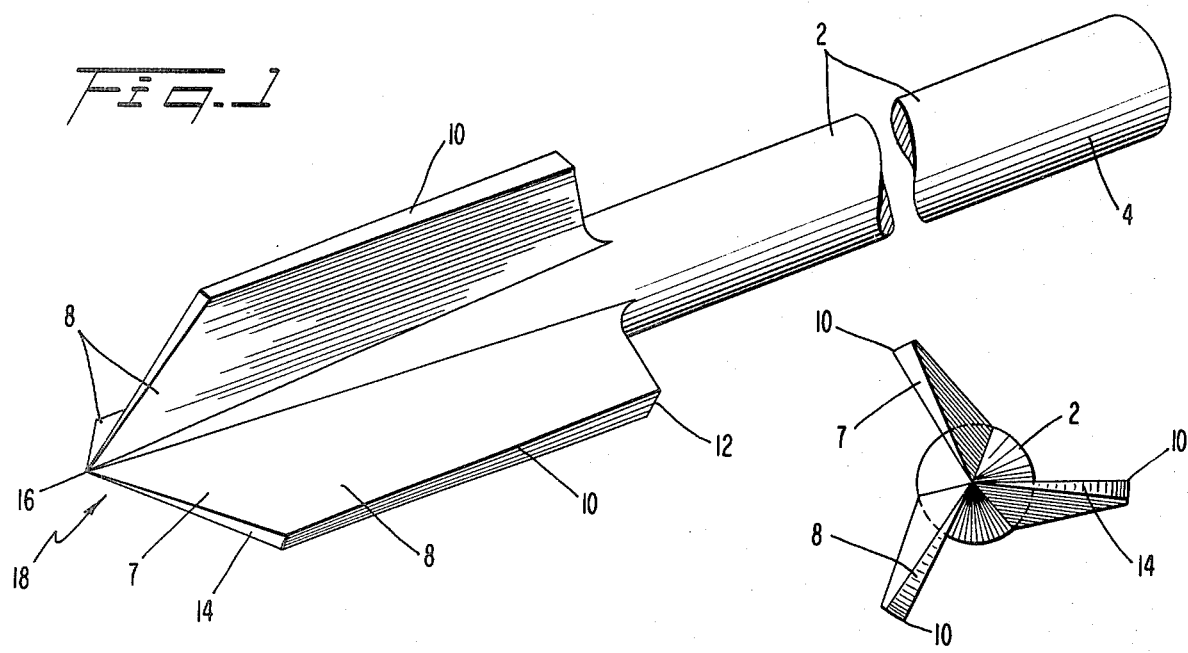
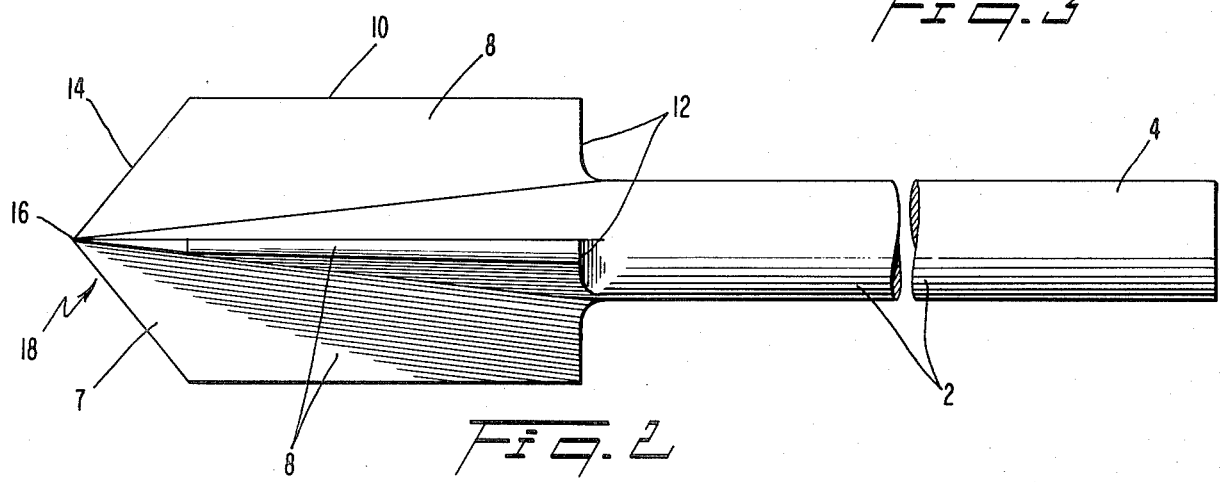
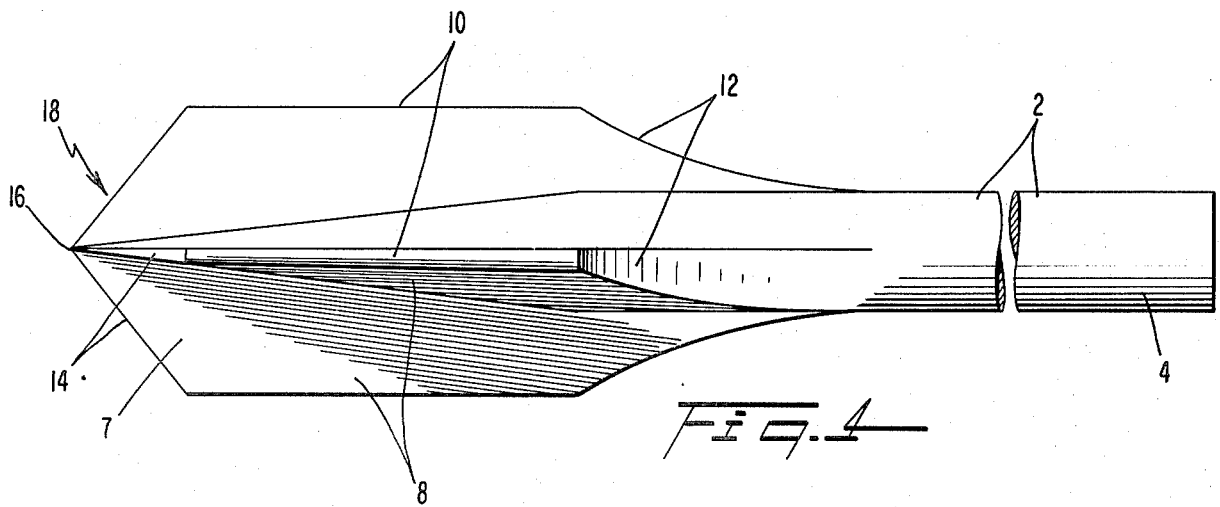

DRILL BIT

BACKGROUND OF THE INVENTION

1. Field of the Invention

This invention relates to drill bits for material such as wood and plastic. More particularly, the invention relates to a three-bladed spade-type drill bit having a conical countersink cutting point.

2. Description of the Prior Art

In drilling cylindrical holes in relatively soft materials such as wood or plastic, one of the more popular drill bits is the spade bit similar to that depicted in U.S. Pat. No. 3,997,279 issued to Porter. This type of bit is particularly useful in drilling reasonably accurate holes of a relatively large diameter.

The spade drill bit of the prior art has several disadvantages. Primarily the bit leaves rough edges around the entrance opening and significant chipping of the surface around the exit opening. Another disadvantage is that the conventional spade drill cannot be used to enlarge an existing hole. Further, since the spade drill bit of the prior art has only two cutting blades on opposite sides of the shaft, it is somewhat unstable requiring very careful control when in use.

The conventional countersink drill is a multi-bladed drill bit forming a conical point which is used for making limited depth impressions as around the entrance of a smaller diameter screw hole for recessing the screw head. the countersink drill may be used on pre-existing holes, is quite stable, and leaves smooth edges around the entrance hole.

The instant invention overcomes the disadvantages of the spade drill while retaining its advantages, and combines the features of the countersink drill. The drill of the instant invention makes cylindrical holes in material of various thicknesses with little or no chipping or splintering on the surface around the entrance or exit openings, is stable thereby requiring only moderate control, is self-centering, and may be used to enlarge existing holes. Further, the instant invention makes a cylindrical hole with a much smoother inner surface than provided by the conventional spade drill. In addition, because of the wide space between blades, maximum chip clearance is achieved.

SUMMARY OF THE INVENTION

The drill bit of the invention comprises a shank defining an axis and three spade-type cutting blades extending radially from the shank. Each cutting blade has a main cutting edge and a cutting point edge. The main cutting edges of the blades define a right circular cylinder coaxial with the shank axis. At one end of the shank a countersink cutting point is formed by the cutting point edges which define a right circular cone coaxial with the shank axis. The base of the defined cone is congruent with the cylinder defined by the main cutting edges. Except for the apex of the defined cone where the cutting point edges join, corresponding points on the cutting blades are 120° apart around the shank axis.

Preferably the slope of the cutting point edges forming the countersink point is approximately 40° to the axis.

Preferably the cutting blades are planar and the main cutting edges are parallel to the axis.

It is preferred that the shank be substantially longer than the cutting blades.

The ends of the cutting blades remote from the countersink cutting point may be substantially normal to the axis or may gradually slope in an obtuse angle from the shank.

The invention provides a drill having three cutting blades equally spaced around an axis and incorporating a conical countersink-type drill cutting point which overcomes the disadvantages of the conventional spade drill.

The significance of the invention is the improved inner surface of the bore, the improved surface around the entrance and exit holes, the improved stability of the drill when in use, and the addition of the ability to enlarge existing holes.

Additional advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

BRIEF DESCRIPTION OF THE DRAWINGS

FIG. 1 is a perspective view of the drill bit of this invention.

FIG. 2 is a side view of the drill bit of FIG. 1.

FIG. 3 is an end view of the cutting point of the drill bit of FIG. 1.

FIG. 4 is a side view of another embodiment of drill bit of this invention.

DESCRIPTION OF THE PREFERRED EMBODIMENT

In accordance with the invention, as seen in FIGS. 1-3, the drill bit comprises a shank 2 defining an axis.

As here embodied, the cross-section of the shank 2 is circular although it may be polygonal. The driving end 4 of the shank 2 will normally be shaped to fit the chuck of the drill with which the bit is intended to be used.

In accordance with the invention, three cutting blades 8 extend radially from the shank 2. Each cutting blade 8 has a main cutting edge 10 and a cutting point edge 7. The main cutting edges 10 of the blades 8 define a right circular cylinder coaxial with the axis of the shank 2.

Preferably, the blades 8 are integrally formed with the shank 2 by casting or forging.

It is preferred that the cutting blades 8 be planar and the main cutting edges 10 be parallel to the axis of the shank 2.

It is also preferred that the shank 2 be substantially longer than the cutting blades 8. As in prior art spade drills, the shank 2 may be six times as long as the cutting blades 8.

In accordance with the invention, the cutting point edges 7 of the blades 8 at one end of the shank 2 form a countersink cutting point 18. The cutting point edges 7 define a right circular cone coaxial with the axis of the shank 2. The base of the cone defined by the cutting point edges 7 is congruent with one end of the cylinder defined by the main cutting edges 10.

Preferably, the ends 12 of the blades 8 remote from the countersink cutting point 18 may be substantially normal to the axis of the shank 2 (FIGS. 1-3) or the ends 12 of the blades 8 may gradually slope at an obtuse angle from the shank 2 (FIG. 4).

Preferably, the slope of the cutting point edges 7 is approximately 40° to the axis of the shank 2.

In accordance with the invention, for proper balance and accurate cutting, except for the apex of the cone defined by the cutting point edges 7, corresponding points on the cutting blades 8 are 120° apart around the axis of the shank 2. Further, the cutting blades 8 should be uniform in dimension.

In operation, the driving end 4 of the shank 2 is locked into the chuck of a portable power drill or stationary drill press. The point 16 of the countersink cutting point 18 is pressed into the material through which a hole is to be drilled at the place desired. As rotation begins, the cutting point edges 7 of the countersink point 18 start the hole and center and stabilize the bit. Continued drilling brings the main cutting edges 10 of the blades 8 into contact with the material providing smooth, vertical sides to the hole. The three cutting blades 8 provide stability thereby avoiding inadvertent angling of the drill axis to the intended axis of the hole.

Since the countersink point 18 gradually opens or enlarges the entrance and exit openings, little or no chipping occurs on the surfaces of the material around the entrance and exit openings.

By placing the point 16 of the countersink cutting point 18 into a pre-drilled, smaller hole and rotating the bit, the drill will center itself and enlarge the hole. The countersink point 18 and the three cutting blades 8 provide stability and uniform enlargement of the hole.

The present invention is not limited to the specific embodiment illustrated and described. Departures may be made from the described embodiment without departing from the principles of the invention, and without sacrificing its chief advantages.

What is claimed is:

1. A drill bit for drilling right circular cylindrical holes in materials such as wood or plastic to a depth greater than the length of said bit, comprising:
   (a) an elongated shank defining an axis;
   (b) three elongated, substantially planar cutting blades secured to and radially extending from one end of said shank, each blade having a main cutting edge parallel to said axis and a cutting point edge, the main cutting edges of said blades defining a right circular cylinder coaxial with said axis and defining the length of said bit, said blades and shank defining unobstructed chip clearance channels being substantially constant in area for the length of said bit and being open for the length of said shank;
   (c) a countersink cutting point at one end of said shank formed by said cutting point edges, the cutting point edges defining a right circular cone coaxial with said axis, the base of said cone being congruent with one end of the cylinder defined by said main cutting edges, and, except for the apex of said cone where said cutting point edges join, corresponding points on said cutting blades are 120° apart around said axis.

2. The drill bit of claim 1 wherein the slope of said cutting point edges forming said countersink point is approximately 40° to said axis.

3. The drill bit of claim 1 wherein said shank is substantially longer than said cutting blades.

4. The drill bit of claim 3 wherein the ends of said cutting blades remote from said countersink cutting point are substantially normal to said axis.

5. The drill bit of claim 3 wherein the ends of said cutting blades remote from said countersink cutting point gradually slope in an obtuse angle from said shank.

* * * * *